United States Patent
Pellman et al.

(10) Patent No.: US 9,551,914 B2
(45) Date of Patent: Jan. 24, 2017

(54) ILLUMINATOR WITH REFRACTIVE OPTICAL ELEMENT

(75) Inventors: Asaf Pellman, Rishpon (IL); David Cohen, Nesher (IL); Giora Yahav, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 660 days.

(21) Appl. No.: 13/042,028

(22) Filed: Mar. 7, 2011

(65) Prior Publication Data

US 2012/0229611 A1   Sep. 13, 2012

(51) Int. Cl.
*H04N 13/02* (2006.01)
*G03B 15/05* (2006.01)

(52) U.S. Cl.
CPC ....... *G03B 15/05* (2013.01); *G03B 2215/0592* (2013.01)

(58) Field of Classification Search
CPC ........ H04N 13/02; G06F 3/0304; G06F 21/00; G06F 3/0325; G06F 3/012; G06F 3/033
USPC .............................. 74/512, 513, 560; 348/49
See application file for complete search history.

(56) References Cited

U.S. PATENT DOCUMENTS

| | | | |
|---|---|---|---|
| 4,445,774 A * | 5/1984 | Spinelli et al. | 355/71 |
| 4,627,620 A | 12/1986 | Yang | |
| 4,630,910 A | 12/1986 | Ross et al. | |
| 4,641,964 A * | 2/1987 | Mitani et al. | 356/125 |
| 4,645,458 A | 2/1987 | Williams | |

(Continued)

FOREIGN PATENT DOCUMENTS

| | | |
|---|---|---|
| CN | 101142806 A | 3/2008 |
| CN | 101254344 B | 6/2010 |

(Continued)

OTHER PUBLICATIONS

Sales, Tasso R.M. "Efficient and uniform illumination with microlens-based band-limited diffusers". Photonics Spectra [online], Apr. 12, 2010, [retrieved on Dec. 22, 2010], 4 pages, Retrieved from the Internet: <URL:http://www.photonics.com/Article.aspx?AID=41972>, Laurin Publishing: Pittsfield, MA, USA.

(Continued)

*Primary Examiner* — Chikaodili E Anyikire
*Assistant Examiner* — Kehinde O Abimbola
(74) *Attorney, Agent, or Firm* — Micah Goldsmith; Judy Yee; Micky Minhas

(57) ABSTRACT

An illumination system having a refractive optical element that compensates for dependence in irradiance of images of objects captured by a photosensor is provided. The refractive optical element may structure the light such that similar objects in the same spherical surface in the field of view of the camera have the same irradiance on the camera photosensor. The illumination system may have an image sensor, a light source, and a refractive optical element. The image sensor has a photosensor that captures images of objects in a field of view. The irradiance of images of objects having a given exitance that are captured by the photosensor may depend on angular displacement from an optical axis of the image sensor. The refractive optical structures light from the light source to illuminate the field of view to compensate for the dependence of irradiance on angular displacement from the optical axis.

20 Claims, 12 Drawing Sheets

(56) References Cited

U.S. PATENT DOCUMENTS

| | | | |
|---|---|---|---|
| 4,647,144 A * | 3/1987 | Finkel | 359/204.1 |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,818,528 A * | 10/1998 | Roth et al. | 348/364 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,859,326 B2 | 2/2005 | Sales | |
| 6,873,723 B1 | 3/2005 | Aucsmith et al. | |
| 6,876,496 B2 | 4/2005 | French et al. | |
| 6,900,946 B2 * | 5/2005 | Koehler | 359/679 |
| 6,937,742 B2 | 8/2005 | Roberts et al. | |
| 6,950,534 B2 | 9/2005 | Cohen et al. | |
| 6,963,445 B2 | 11/2005 | Hoover et al. | |
| 7,003,134 B1 | 2/2006 | Covell et al. | |
| 7,033,736 B2 | 4/2006 | Morris et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,057,814 B2 | 6/2006 | Boyd et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,372,977 B2 * | 5/2008 | Fujimura et al. | 382/103 |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,428,856 B2 * | 9/2008 | Podkopayev | 74/560 |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,513,668 B1 | 4/2009 | Peng et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |

(56) References Cited

U.S. PATENT DOCUMENTS

| | | | |
|---|---|---|---|
| 7,576,727 B2 | 8/2009 | Bell | |
| 7,590,262 B2* | 9/2009 | Fujimura et al. | 382/104 |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2* | 11/2009 | Fujimura et al. | 382/103 |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,767,949 B2* | 8/2010 | Perlman et al. | 250/208.1 |
| 7,809,167 B2 | 10/2010 | Bell | |
| 7,812,304 B2 | 10/2010 | Ikeda et al. | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,031,906 B2* | 10/2011 | Fujimura et al. | 382/103 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2003/0029917 A1* | 2/2003 | Hennick et al. | 235/454 |
| 2004/0257669 A1* | 12/2004 | Koehler | 359/676 |
| 2005/0031166 A1* | 2/2005 | Fujimura et al. | 382/103 |
| 2005/0058337 A1* | 3/2005 | Fujimura et al. | 382/159 |
| 2006/0157640 A1* | 7/2006 | Perlman et al. | 250/208.1 |
| 2007/0086176 A1 | 4/2007 | Kanade et al. | |
| 2008/0026838 A1 | 1/2008 | Dunstan et al. | |
| 2008/0043466 A1 | 2/2008 | Chakmakjian et al. | |
| 2008/0062424 A1 | 3/2008 | Shires et al. | |
| 2008/0212836 A1* | 9/2008 | Fujimura et al. | 382/103 |
| 2009/0167922 A1* | 7/2009 | Perlman et al. | 348/340 |
| 2010/0034427 A1* | 2/2010 | Fujimura et al. | 382/106 |
| 2010/0220212 A1* | 9/2010 | Perlman et al. | 348/229.1 |
| 2010/0238526 A1 | 9/2010 | Baxter et al. | |
| 2010/0253810 A1* | 10/2010 | Povlick et al. | 348/234 |
| 2011/0115885 A1* | 5/2011 | Wernersson | 348/47 |
| 2012/0193517 A1* | 8/2012 | Zickler et al. | 250/208.2 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Chinese Office Action dated Nov. 4, 2015, Chinese Patent Application No. 201210056397.7.

Response to Office Action dated Mar. 21, 2016, Chinese Patent Application No. 2012100563977.

English translation of the Amended Claims (Marked-up Version) filed in Response to Office Action dated Mar. 21, 2016, Chinese Patent Application No. 2012100563977.

(56) References Cited

OTHER PUBLICATIONS

Notice on Grant of Patent Right for Invention and Granted Claims dated May 17, 2016, Chinese Patent Application No. 201210056397.7.

* cited by examiner

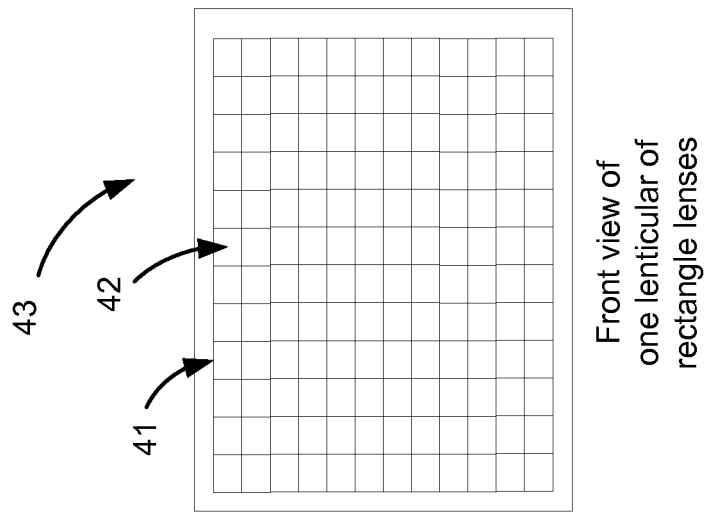
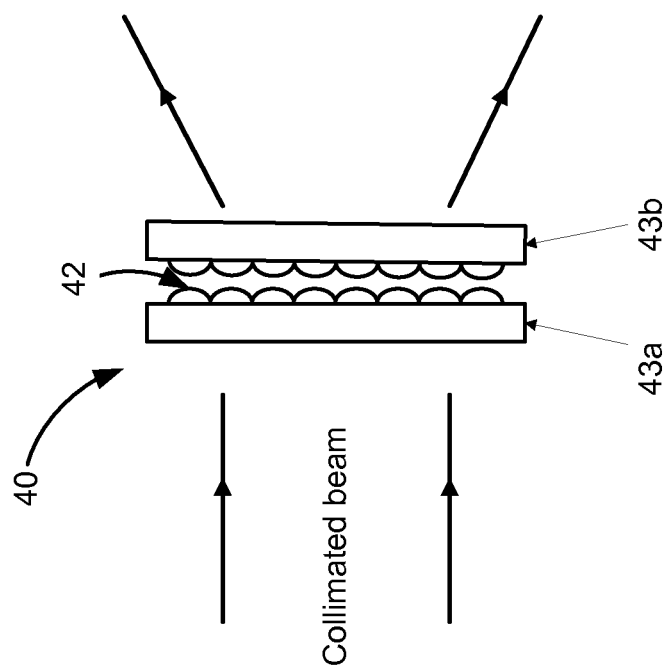
Fig. 3B
Fig. 3A

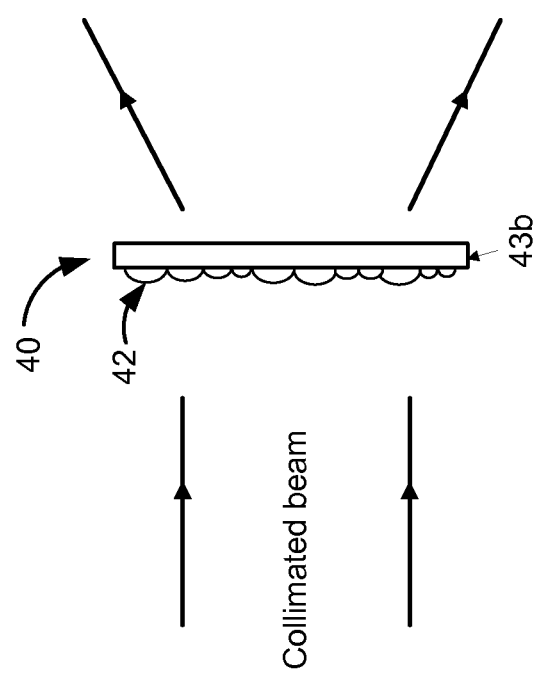

ILLUMINATOR WITH REFRACTIVE OPTICAL ELEMENT

BACKGROUND

The amount of electromagnetic radiation (e.g., light) that a camera photosensor collects and images may depend on the location of objects in the field of view (FOV) of the camera. Briefly, an object that is on the camera's optical axis may appear brighter to the camera's photosensor than an object that is off-axis, other factors being equal. The term "irradiance" generally refers to the electromagnetic radiation that is incident on a surface, such as a photosensor. The terms "radiant exitance" or "radiant emittance" generally refer to electromagnetic radiation that emerges (e.g., reflects) from an object. Irradiance, as well as exitance may be measured per second per unit area. For an object having an angular displacement "$\theta$" relative to the camera's optical axis, the irradiance may, in general, decrease as $\cos^4 \theta$.

For various applications, it can be advantageous for objects in a scene imaged by a camera to have substantially the same irradiance on the camera photosensor independent of the angular displacement $\theta$. For example, a time of flight (TOF) three-dimensional (3D) camera determines distances to objects in a scene that the camera images by timing how long it takes for light transmitted by the camera to travel to the objects and back to the camera. For some systems, an illumination system transmits the light to the object in very short light pulses. The camera images light that is reflected by the objects and is collected by the photosensor to determine round trip travel times for light. Accurate distance measurement depends on the irradiance associated with the image of the object captured by the photosensor. Moreover, accuracy may improve with increase in the irradiance.

SUMMARY

An illumination system having a refractive optical element that compensates for dependence in irradiance of images of objects captured by a photosensor is provided. The irradiance of images of objects having a given exitance may depend on angular displacement from an optical axis. The refractive optical element may be used in an imaging device such as a time-of-flight (TOF) camera. The refractive optical element may structure the light such that similar objects in the same spherical surface in the field of view of the camera have the same irradiance on the camera photosensor.

One embodiment is an illumination system that comprises an image sensor, a light source, and a refractive optical element. The image sensor has a photosensor that captures images of objects in a field of view. The irradiance of images of objects having a given exitance that are captured by the photosensor depends on angular displacement from an optical axis of the image sensor. The refractive optical element receives light from the light source and structures the light to illuminate the field of view to compensate for the dependence of irradiance on angular displacement from the optical axis.

One embodiment is a depth camera system that comprises an image sensor, a light source, a collimator, and a refractive diffuser. The photosensor captures images of objects in a field of view. The collimator collimates light from the light source. The refractive diffuser receives light from the light source and structures the light within the field of view in accordance with $1/\cos^4 \theta$, where $\theta$ is the angular displacement from an optical axis of the image sensor. The depth camera system also has logic for generating a depth image based on the light received by the photosensor.

One embodiment is a method of generating a depth image that includes the following. Light is refracted onto objects in a field of view using a refractive diffuser. Light that reflects from objects in the field of view is captured at a photosensor having an optical axis. The irradiance of images of objects having a given exitance that are captured by the photosensor depends on angular displacement from the optical axis. Refracting the light includes structuring the light to compensate for the dependence of irradiance on angular displacement from the optical axis. A depth image is generated based on the captured light.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 3A depicts a side view of a refractive diffuser with a pair of lenticular arrays.

FIG. 3B depicts a front view of one of the arrays of lenticulars of FIG. 3A.

FIG. 3C depicts a side view of a refractive diffuser based on array of microlenses.

DETAILED DESCRIPTION

An illuminator with a refractive optical element is disclosed. The illuminator may be used in, or in conjunction with, a camera or other device having a photosensor. The refractive optical element may be configured to illuminate a camera's field of view (FOV) in a way that compensates for angular displacement related dependence in irradiance of images captured by a photosensor. Specifically, the irradiance of images of objects that have the same exitance may depend on the angular displacement of the objects from the optical axis. In some embodiments, the refractive optical element is a refractive diffuser that structures the light to have an increasing intensity with increasing angular displacement from an optical axis of the camera. The increasing intensity may compensate for the dependence in irradiance on angular displacement.

Figure 1:
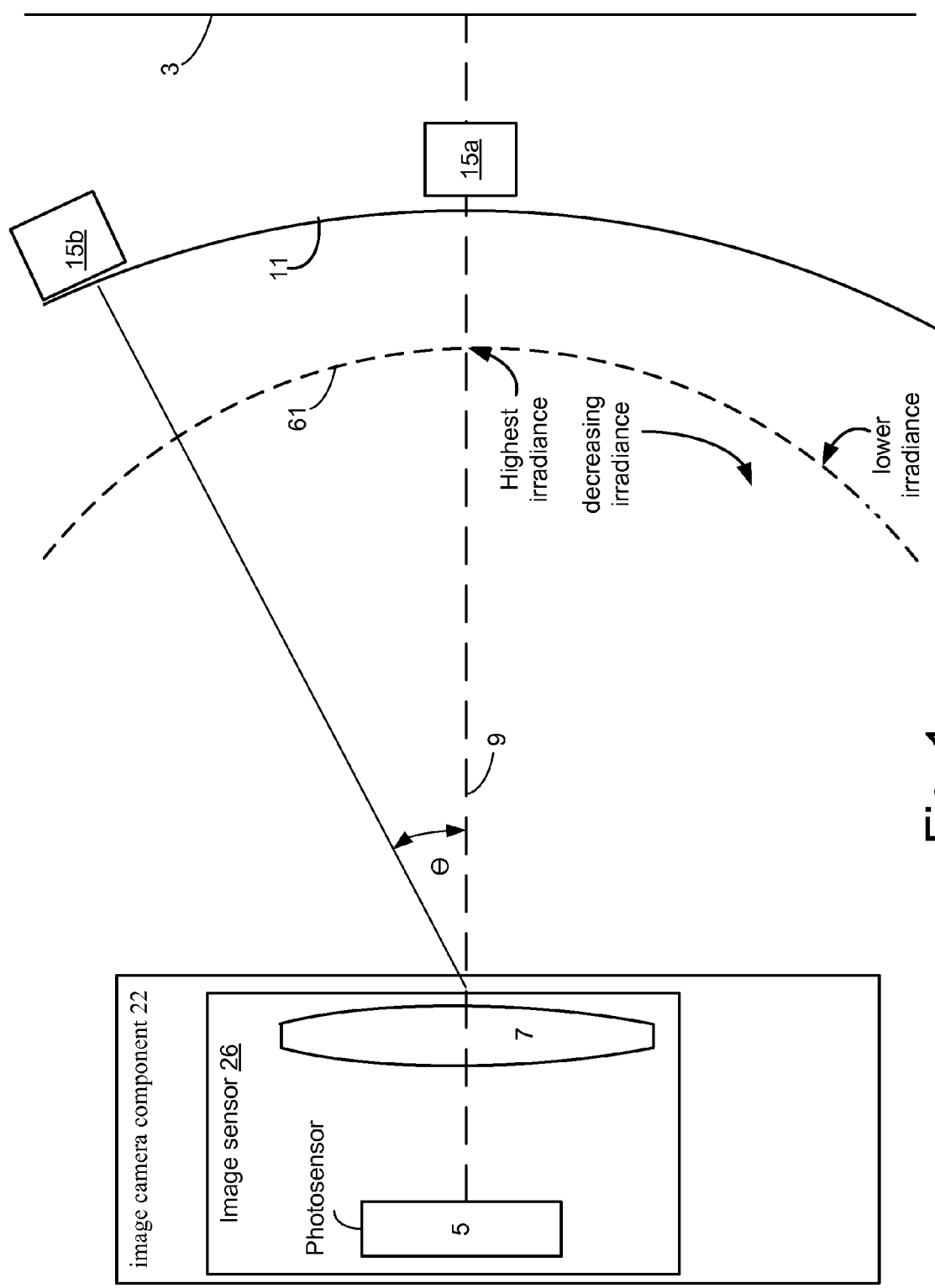
FIG. 1 shows one embodiment of an image sensor within an image camera component.
Figure 2A:
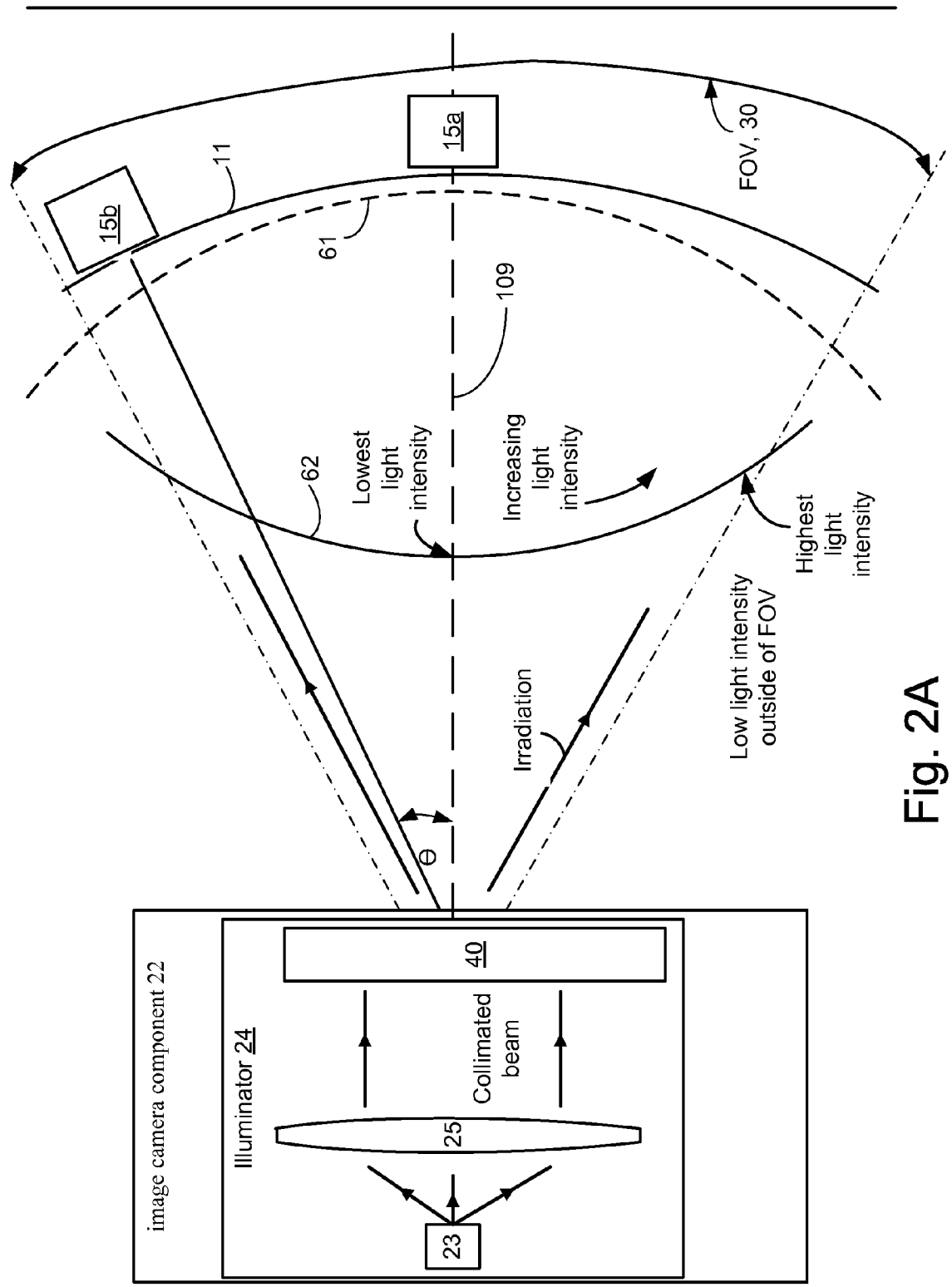
FIG. 2A shows one embodiment of an illuminator in an image camera component.

FIG. 1 shows one embodiment of an image sensor 26 within an image camera component 22. The image sensor 26 includes a photosensor 5 and a focusing lens 7. Note that the image camera component 22 may also include an illuminator, which may illuminate the FOV. FIG. 2A shows one embodiment of an illuminator 24 in an image camera component 22. Note that both the illuminator 24 and image sensor 26 may be present in the same image camera component 22. However, it is not an absolute requirement that the illuminator 24 and image sensor 26 are housed in the same device. For purposes of discussion, first the image sensor 26 of FIG. 1 will be discussed. In some embodiments, the image camera component 22 is part of a depth camera system, an example of which will be described below. However, the image camera component 22 could be used other devices that use a photosensor 5.

As with other Figures, FIG. 1 is not necessarily shown to scale. In general, light that reflects from objects 15a, 15b in the FOV is focused by the lens 7 onto the photosensor 5. For convenience of presentation, a plane surface 3 in the FOV that is perpendicular to the camera component's optical axis 9, is referred to as a "planar FOV imaging surface." Similarly, a spherical surface 11 in the FOV of the camera component 22 having its center at an optical center of the camera component 22, is referred to as a "spherical FOV imaging surface."

As noted, the irradiance of an object may depend on its position in the FOV. For example, object 15a is depicted on the optical axis 9, whereas object 15b is depicted off axis by approximately the angle θ. However, both are on the spherical surface 11, and are thus the same distance from the camera component 22. If, for the sake of argument, the exitance of object 15a and 15b were the same, then the irradiance of the image of object 15b captured by the photosensor 5 may be significantly less than the irradiance of the image of object 15a. In other words, to the photosensor 5, the image of object 15b would be less intense than the image of object 15a. The irradiance may fall off with angular displacement θ from the optical axis 9. In some cases, the falloff may be about $\cos^4 \theta$.

A dashed curve 61 representing $R(\theta)=\cos^4 \theta$ is shown to the left of spherical FOV imaging surface 11. As noted, the falloff in irradiance may be about $\cos^4 \theta$, where θ is the angular displacement with respect to the optical axis 9. The label "decreasing irradiance" is meant to represent that the images of the objects captured at the photosensor 5 have a decreasing irradiance away from the optical axis 9. Thus, the decreasing irradiance is referring to the images that the photosensor 5 captures. Therefore, note that the decreasing irradiance is not referring to the exitance of the objects 15 in the FOV.

For various applications it can be advantageous for objects that in fact have the same exitance to have substantially the same irradiance on the camera photosensor independent of the angular displacement from the optical axis 9. For example, a time of flight (TOF) three-dimensional (3D) camera provides distances to features in a scene that the camera images by timing how long it takes light transmitted by the camera to travel to the features and back to the camera. For some techniques the time of the light is actually based on intensity of light, as the following discussion will explain.

To time the travel of the light, the illumination system may transmit a number of very short light pulses into the FOV. These light pulses reflect off from objects 15 and back to the image sensor 26, which captures the light for some period of time. The photosensor 5 may comprise an array of pixels, each of which generates a light intensity value. Each pixel represents a different location in the FOV. The time of flight of the light pulse may then be determined based on the intensity of light at each pixel. Since the time of flight is dependent on light intensity, being able to accurately compensate for dependence of irradiance on angular displacement from the optical axis 9 may allow for much more accurate determinations of distances to objects 15.

Therefore, precision determination of a distance measurement to an object 15 may be dependent on the irradiance associated with the image of the object that the photosensor 5 captures. Moreover, precision determination of a distance measurement may improve with increase in the irradiance. Therefore, being able to illuminate the FOV with a higher intensity of light may improve distance determination.

As the foregoing suggests, for applications of a 3D TOF camera, such as applications involving gesture recognition and/or interfacing a computer with people who are simultaneously interacting in a same computer game running on the computer, it may generally advantageous for objects in a same planar 3 or spherical surface 11 in the FOV of the camera to have a same irradiance on the camera photosensor.

To compensate for dependence in irradiance with angular displacement from the optical axis 9, an illumination system may be configured to increase illumination with increasing angular displacement θ from the optical axis 9. As a result, objects 15 having greater angular displacement from the optical axis 9 may be illuminated with more intense light so that they have greater exitance. As one example, an illuminator could illuminate object 15b with greater light intensity than object 15a to increase the exitance of object 15a. In one embodiment, an illumination system illuminates the camera's FOV with light having intensity substantially proportional to $1/\cos^4 \theta$. Thus, the illumination system may compensate for the aforementioned dependence in irradiance that may be proportional to $\cos^4 \theta$, where θ is the angle of displacement from the optical axis 9. However, note that outside of the FOV, the light intensity may be very low, such that energy is not wasted.

FIG. 2A shows one embodiment of an image camera component 22 having an illuminator 24. In this embodiment, the illuminator 24 has a light source 23, a collimator 25, and a refractive optical element 40. In some embodiments, the refractive optical element 40 may also be referred to as a refractive diffuser. The refractive optical element 40 may receive light from the light source 23 and structure the light to illuminate the FOV to compensate for dependence in irradiance on angular displacement from an optical axis. That is, the refractive optical element 40 may compensate for dependence in irradiance of images of objects captured by the photosensor 5 with increasing angle of the objects from an optical axis (such as optical axis 9, FIG. 1).

In the embodiment of FIG. 2A, the collimator 25 is between the refractive optical element 40 and the light source 24. However, the refractive optical element 40 could be located between the light source 24 and the collimator 25. While the collimator 25 and refractive optical element 40 are depicted as separate physical elements in the embodiment of FIG. 2, in other embodiments, they form one integrated component. Although not explicitly depicted in FIG. 2A, the image camera component 22 may have a photosensor (such as photosensor 5, FIG. 1).

Curve 62 represents the intensity of light provided by the illuminator 24. The curve 62 is intended to show that the intensity of light provided by the illuminator 24 increases with increases in angular displacement from the illumination axis 109. For example, the lowest intensity of light within the FOV may be along the illumination axis 109. The light intensity may increase within the FOV with greater angular displacement from the illumination axis 109. Thus, object 15b may be illuminated with greater intensity than object 15a. Therefore, object 15b may have a greater exitance than object 15a, other factors being equal. However, note that outside of the FOV, the light intensity may be quite low, such that energy is not wasted illuminating where it is not needed. As one example, the refractive optical element 40 may have an optical efficiency of about 95%.

Figure 2B:
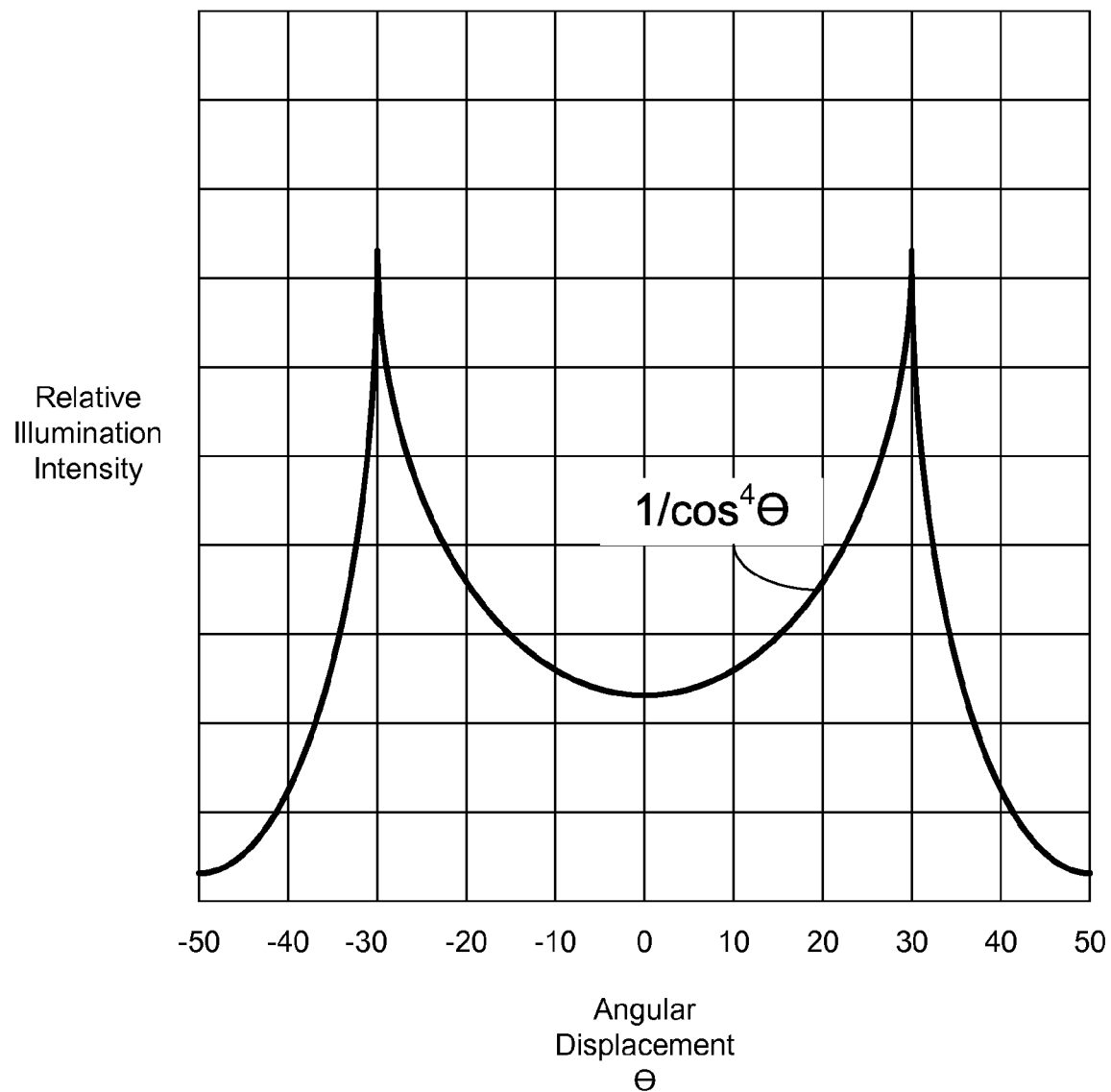
FIG. 2B shows illumination intensity created by the one embodiment of an illuminator.

FIG. 2B is a graphical representation of the relative illumination intensity as a function of angular displacement from an optical axis. The intensity may be for the spherical surface 11 at some arbitrary distance from the illuminator 24. In this example, the FOV may range from −30 degrees to +30 degrees. Within this range, the light intensity may be approximately $1/\cos^4 \theta$. However, outside of this range, the light intensity may fall off very quickly. Note that the light fall-off outside of the FOV is just one example and that the relative illumination intensity could have a significantly different shape outside of the FOV.

Referring again to FIG. 2A, illuminator 24 is configured to illuminate the FOV to compensate for dependence of irradiance on angular displacement $\theta$ for images of objects in the FOV located on a spherical FOV imaging surface 11. A dashed curve 61 representing $R(\theta)=\cos^4 \theta$ is shown to the left of spherical FOV imaging surface 11. Curve 61 was also shown and discussed with respect to FIG. 1. As noted, the falloff in irradiance may be $\cos^4 \theta$, where $\theta$ is the angular displacement with respect to the optical axis 9.

Next, some example refractive optical elements 40 will be discussed. In one embodiment, refractive diffuser 40 comprises a pair of lenticular arrays 43. FIG. 3A depicts a side view of a refractive diffuser 40 with a pair of lenticular arrays 43. FIG. 3B depicts a front view of one of the lenticular arrays 43 of FIG. 3A. Each lenticular array 43 has lenses 42. As one example, a lens 42 may be about a few hundred microns in diameter; however, a lens 42 may have a larger or smaller diameter. The lenses 42 may also be referred to as lenslets.

Referring now to FIG. 3A, the refractive optical element 40 may include two lenticulars 43a, 43b, each of which houses one array of lenses 42. A collimated light beam is received at lenticular 43a and passes through the lenslets 42 in lenticular 43a. In this embodiment, the lenslets 42 are depicted as having a convex surface, although other options such as concave are possible. After being refracted by lenslets 42 in lenticular 43a, the light rays pass through a gap before entering lenslets 42 in lenticular 43b. The gap may be an air gap, although the gap could be formed from a substance other than air. The light rays then pass into the convex surface of the lenslets 42 on lenticular 43b. Therefore, the light rays may be refracted again. Then, the light rays pass out of lenticular 43b. Two example light rays are shown as diverging from lenticular 43b. As noted above, the refractive optical element 40 may structure the light in a way that compensates for the dependence in irradiance on angular displacement. In some embodiments, the refractive optical element 40 may diffuse the light in a way that its intensity is higher with greater angular displacement from the illumination axis. However, the light intensity may drop significantly outside of a FOV, such that energy is not wasted.

Referring now to FIG. 3B, the front view of one lenticular 43 shows that in this embodiment, an array of lenses 42 may have a rectangular shape. However, other shapes are possible. As noted above, one surface of the lenses 42 may have a convex shape. The opposite surface of the lenses 42 could have a variety of shapes. In one embodiment, the opposite surface is substantially flat.

Note that the lenses 42 are not required to all be the same curvature, size, and/or shape. In some embodiments, the lenses 42 in an array have a variety of different curvatures. Therefore, different lenslets 42 may refract the light to different degrees. In some embodiments, the lenses 42 in an array have a variety of different shapes. For example, some lenslets 42 might be rectangular, others triangular, etc. In some embodiments, the lenses 42 in an array have a variety of the different sizes. FIG. 3C depicts one embodiment of a refractive optical element 40 in which the lenses 42 have different curvatures, as well as different sizes. The lenses 42 in FIG. 3C may be tens of microns in diameter; however, the lenses 42 could have a larger or smaller diameter. The lenses 42 in FIG. 3C may be referred to as microlenses. In some embodiments, the illumination intensity is created by selection of suitable variety of lens curvatures, sizes, and/or shapes. Note that one or more of these, or other properties, may be used to generate the desired illumination intensity profile.

FIG. 3A shows that the lenses 42 of one array 41 are facing the lenses 42 of the other array 41. However, other configurations are possible. For example, there might be only a single array of lenses 42, as in FIG. 3C. In this case, the refractive optical element 40 might appear more like either lenticular 43a or 43b. Also, there could be more than two arrays 41 of lenslets. For example, there might be three arrays 41, four arrays 41, etc.

Figure 3E:
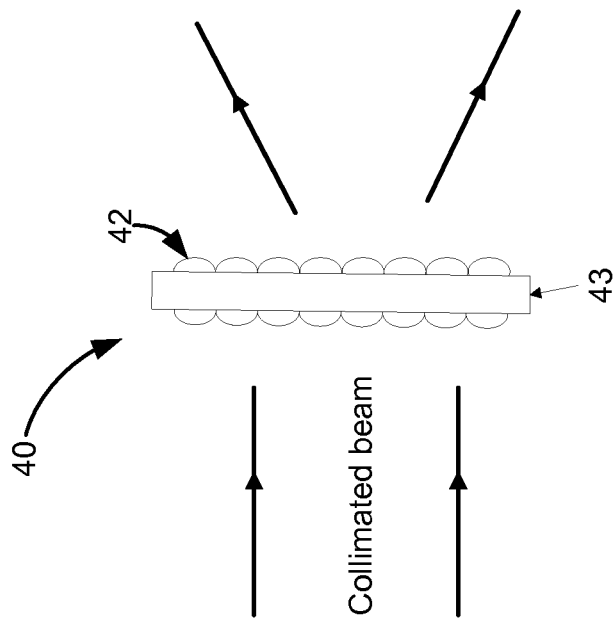
FIG. 3E shows one embodiment in which two arrays of lenses are on opposite sides of a single lenticular.
Figure 3D:
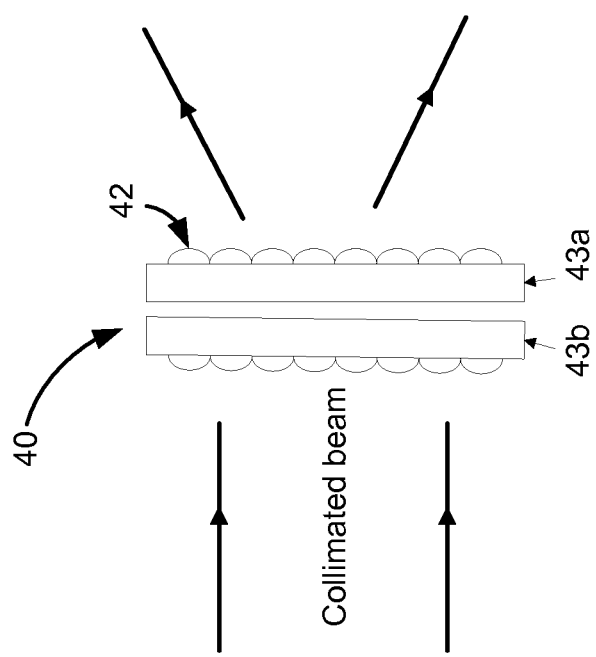
FIG. 3D shows one embodiment in which the positions of lenticulars have a different orientation as compared to FIG. 3A.

Another possible variation is to reverse the positions of lenticulars 43a, 43b. FIG. 3D shows one embodiment in which the positions of lenticulars 43a, 43b have a different orientation as compared to FIG. 3A. FIG. 3E shows one embodiment in which two arrays 41 of lenses 42 are on opposite sides of a single lenticular 43.

Figure 4A:
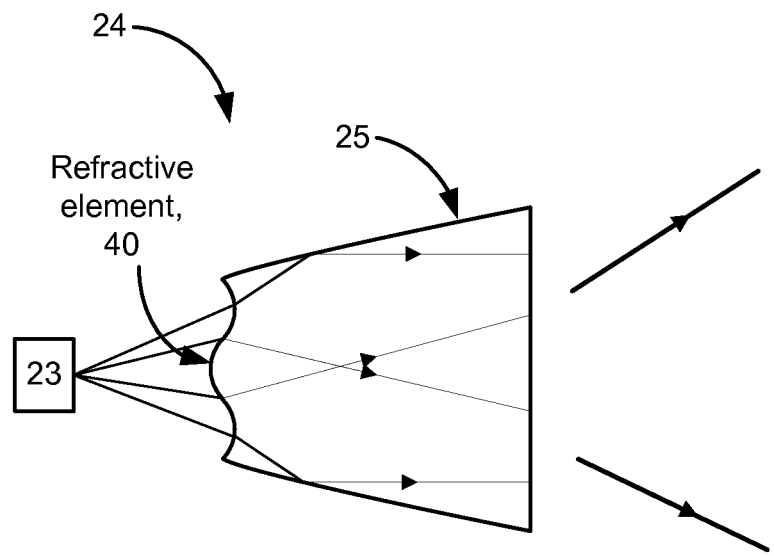
FIG. 4A depicts one embodiment of an illuminator.
Figure 4B:
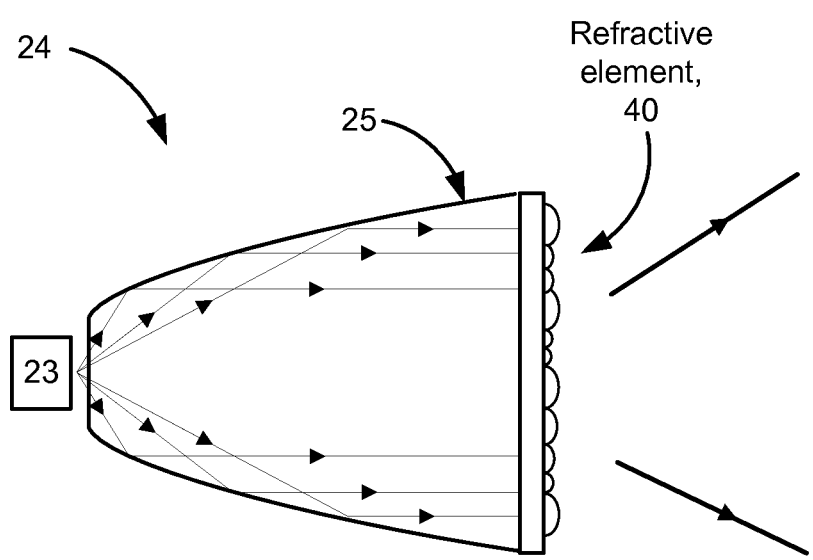
FIG. 4B depicts another embodiment of an illuminator.

FIGS. 4A and 4B depict two other embodiments of illuminators 24. Each illuminator 24 has a light source 23, refractive optical element 40 and a collimator 25. In FIG. 4A, there is a refractive optical element 40 at the input of the device, which refracts non-collimated light from light source 23. The collimator 25 collimates the light by internal reflection. The net effect is to produce a structured light output that compensates for the dependence in irradiance discussed herein. As can be seen by the light beams inside of the collimator 25, some light beams are refracted by refractive optical element 40 towards the inner walls of the collimator 25, and may reflect off from the inner walls of the collimator 25. These internally reflected light beams may serve to collimate the light. Other light beams may be refracted by refractive optical element 40 and pass through the collimator 25 without any further reflection. The device could have lenses 42 at the output side, if additional refraction of the light beam is desired to properly structure the light.

The embodiment of FIG. 4B has a collimator 25 with an array of microlenses at the output. The collimator 25 may receive non-collimated light from light source 23. Thus, by the time that the light reaches the refractive optical element 40, the light may already be collimated. In this embodiment, the microlenses in the refractive element 40 are not uniform in size. That is, some microlenses are larger and some are smaller than others. Also, the microlenses have different curvatures from each other. Thus, the refractive index of microlenses may be different from one another. Note that the pattern of size and/curvature may be a regular pattern or may be random or irregular in same manner. As can be seen in FIG. 4B, the pattern may be irregular.

The example refractive optical elements of FIGS. 3-4 are presented for purposes of illustration. Numerous other configurations could be used. In general, the refractive optical elements 40 may be configured to distribute light from collimated beam 26 so that very little of the light from the beam propagates outside of FOV, and the intensity of the light in the FOV is inversely proportional to the dependence of irradiance realized for objects in the FOV on the angular displacement of the objects.

As noted above, for applications of a 3D TOF camera, such as applications involving gesture recognition and/or interfacing a computer with people who are simultaneously interacting in a same computer game running on the computer, it may be advantageous for objects in a same planar or spherical surface in the FOV of the camera to have a same irradiance on the camera photosensor.

In some embodiments, the refractive diffuser 40 is used in a motion capture system 10. Motion capture systems obtain data regarding the location and movement of a human body or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Motion capture systems can include optical systems, including those using visible and invisible, e.g., infrared, light, which use cameras to detect the presence of a human in a field of view. Typically, the motion capture system includes an illuminator 24, which illuminates the field of view, and an image sensor which senses light from the field of view to form an image.

Figure 5:
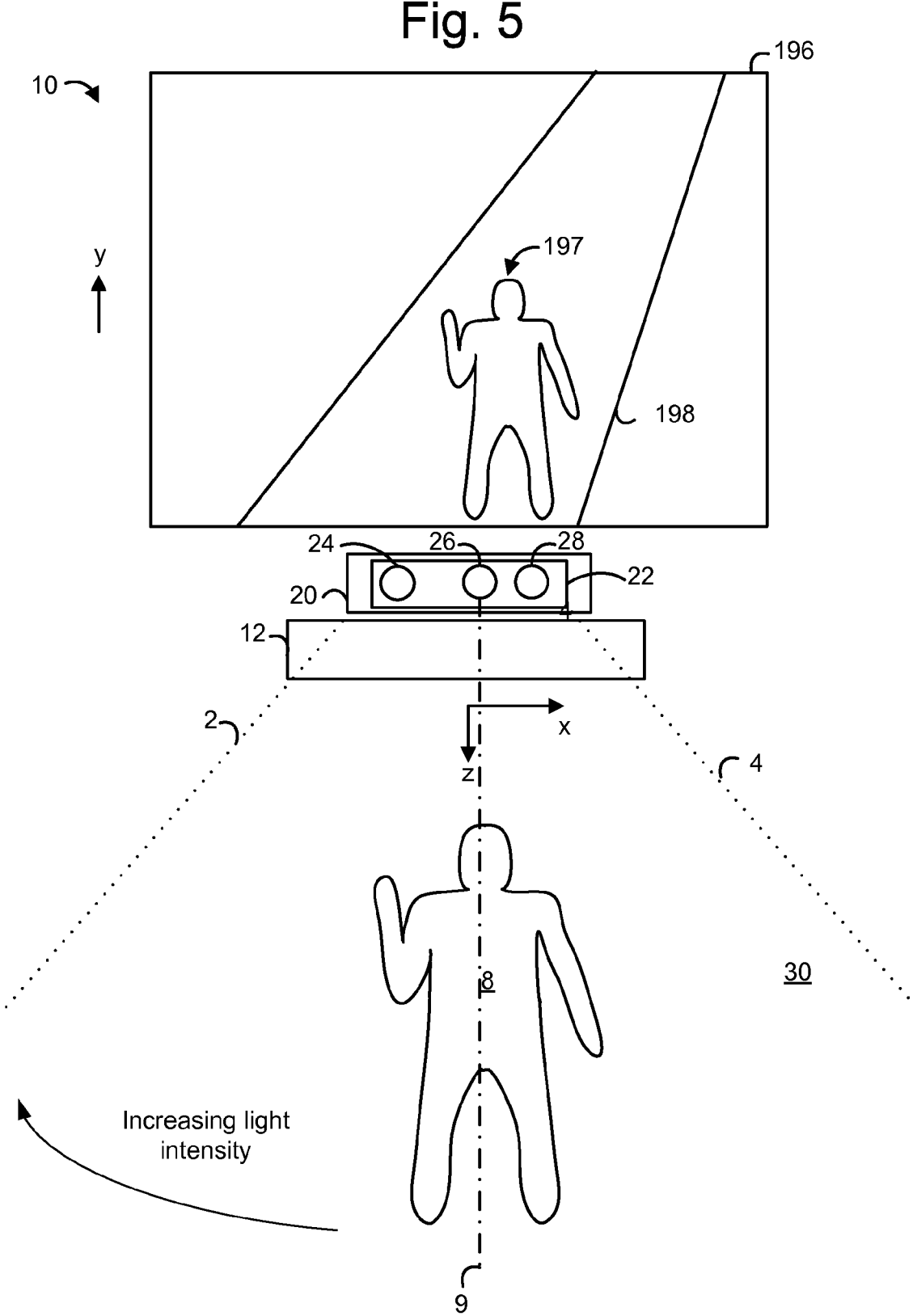
FIG. 5 depicts an example embodiment of a motion capture system.

FIG. 5 depicts an example embodiment of a motion capture system 10 in which a human 8 interacts with an application, such as in the home of a user. The motion capture system 10 includes a display 196, a depth camera system 20, and a computing environment or apparatus 12. The depth camera system 20 may include an image camera component 22 having an illuminator 24, such as an infrared (IR) light emitter, an image sensor 26, such as an infrared camera, and a red-green-blue (RGB) camera 28. A human 8, also referred to as a user, person or player, stands in a field of view 6 of the depth camera. Lines 2 and 4 denote a boundary of the field of view 6.

The illuminator 24 may structure the light such that the light intensity increases with increasing angular displacement from the optical axis 9. The illuminator 24 may structure the light to compensate for dependence in irradiance on angular displacement, as already discussed. Note that the light intensity may be quite low outside of the FOV 30. In this example, the optical axis 9 is aligned with the image sensor 26. The illuminator 24 may have an illumination axis (not depicted in FIG. 5) that is not necessary aligned exactly with the optical axis 9.

In this example, the depth camera system 20, and computing environment 12 provide an application in which an avatar 197 on the display 196 track the movements of the human 8. For example, the avatar may raise an arm when the human raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track one or more human targets. The computing environment 12 can include a computer, a gaming system or console, or the like, as well as hardware components and/or software components to execute applications.

The depth camera system 20 may include a camera which is used to visually monitor one or more people, such as the human 8, such that gestures and/or movements performed by the human may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The human 8 may be tracked using the depth camera system 20 such that the gestures and/or movements of the user are captured and used to animate an avatar or on-screen character and/or interpreted as input controls to the application being executed by computer environment 12.

Some movements of the human 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the human 8 may be available, used, and analyzed in any suitable manner to interact with an application.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the human 8.

Figure 6:
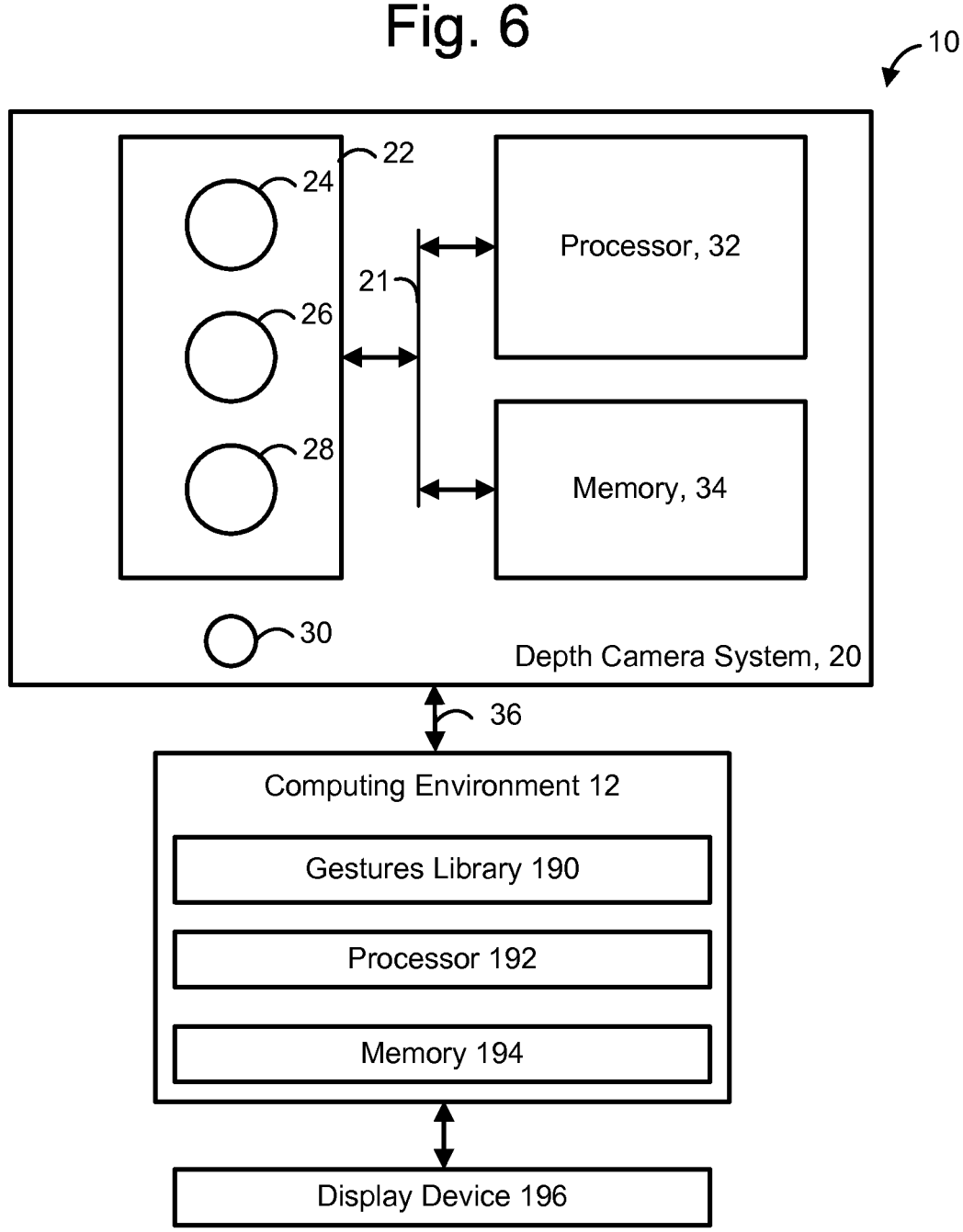
FIG. 6 depicts an example block diagram of the motion capture system of FIG. 5.

FIG. 6 depicts an example block diagram of the motion capture system 10 of FIG. 5. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22 that captures the depth image of a scene in a physical space. The depth image may include a two-dimensional (2-D) pixel area of the captured scene, where each pixel in the 2-D pixel area has an associated depth value which represents a linear distance from the image camera component 22, thereby providing a 3-D depth image.

The image camera component 22 may include an illuminator 24, such an infrared (IR) light emitter 24, an image sensor 26, such as an infrared camera, and a red-green-blue (RGB) camera 28 that may be used to capture the depth image of a scene or provide an additional camera for other applications. The illuminator 24 may be configured to compensate for dependence in irradiance of objects captured by the image sensor 26. Thus, the illuminator 24 may have a refractive optical element 40 such as, but not limited to, any of the examples herein.

A 3-D depth camera is formed by the combination of the infrared emitter 24 and the infrared camera 26. For example, in a time-of-flight analysis, the illuminator 24 emits infrared light onto the physical space and the image sensor 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the illuminator 24. Upon striking the surface of one or more targets or objects in the scene, the pattern may become deformed in response. Such a deformation of the pattern may be captured by, for example, the image sensor 26 and/or the RGB camera 28 and may then be analyzed to determine a physical distance from the depth camera system to a particular location on the targets or objects.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the 3-D depth camera 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the image sensor 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 7:
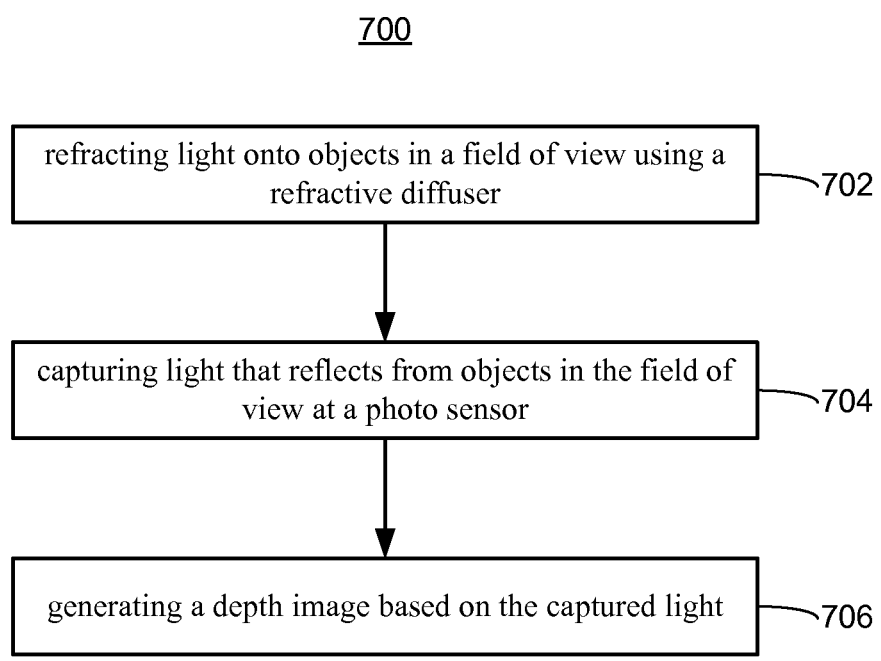
FIG. 7 is a flowchart of one embodiment of a process of generating a depth image.

FIG. 7 is a flowchart of one embodiment of a process 700 of generating a depth image. The process may be performed in a depth camera, such as the example of FIGS. 5 and 6. In process 700, an illuminator 24 having a refractive optical element 40 may be used. Therefore, dependence in irradiance on angular displacement may be compensated for. Step 702 includes refracting light onto objects in a field of view using a refractive diffuser 40. Step 702 may include structuring the light to compensate for the dependence in irradiance on angular displacement. In some embodiments, step 702 includes transmitting a sequence of light (e.g., IR) pulses.

Step 704 includes capturing light that reflects from objects 15 in the field of view at a photosensor 5. There irradiance of images of objects captured by the photosensor 5 may depend based on angular displacement. As noted herein, if two objects have the same exitance, the irradiance of the image of the object that is further from the optical axis may be lower. As noted, step 702 may structure the light to compensate for this dependence in irradiance on angular displacement. In some embodiments, step 704 includes capturing reflections of the IR pulses for some pre-determined time period. For example, the photosensor 5 may be shuttered, such that it is allowed to collect light for some pre-determined time period and blocked from receiving light for some pre-determined time period.

Step 706 includes generating a depth image based on the captured light. The depth image may contain depth values (e.g., distances to objects in the FOV). The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance). In some embodiments, step 706 includes analyzing brightness values of each pixel of the photosensor 5. Since the refractive optical element 40 compensates for the angular displacement related dependence in irradiance, the determination of the depth image is improved.

Figure 8:
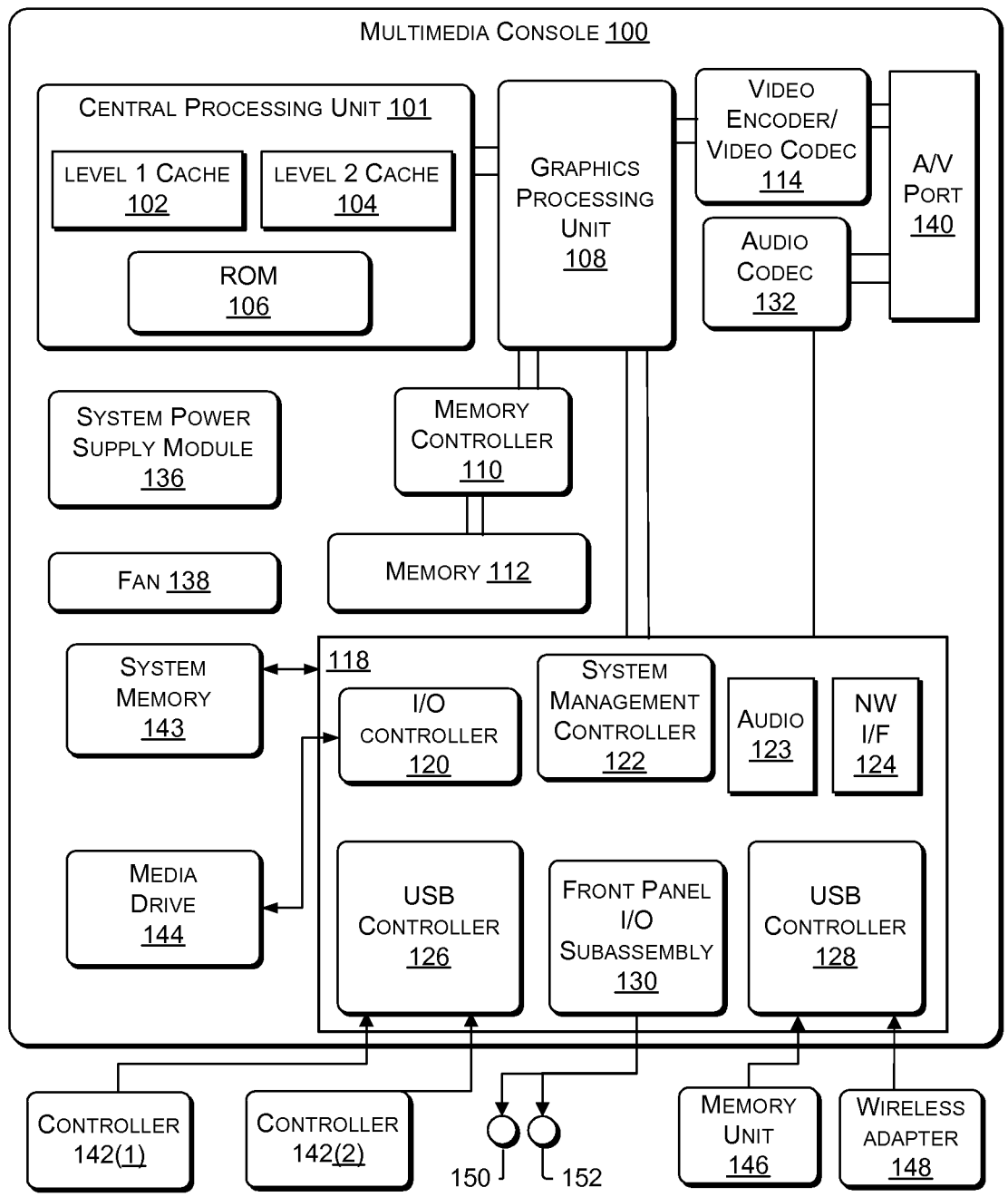
FIG. 8 depicts an example block diagram of a computing environment that may be used in the motion capture system of FIG. 5.

FIG. 8 depicts an example block diagram of a computing environment that may be used in the motion capture system of FIG. 5. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 6, including the cameras 26 and 28.

Figure 9:
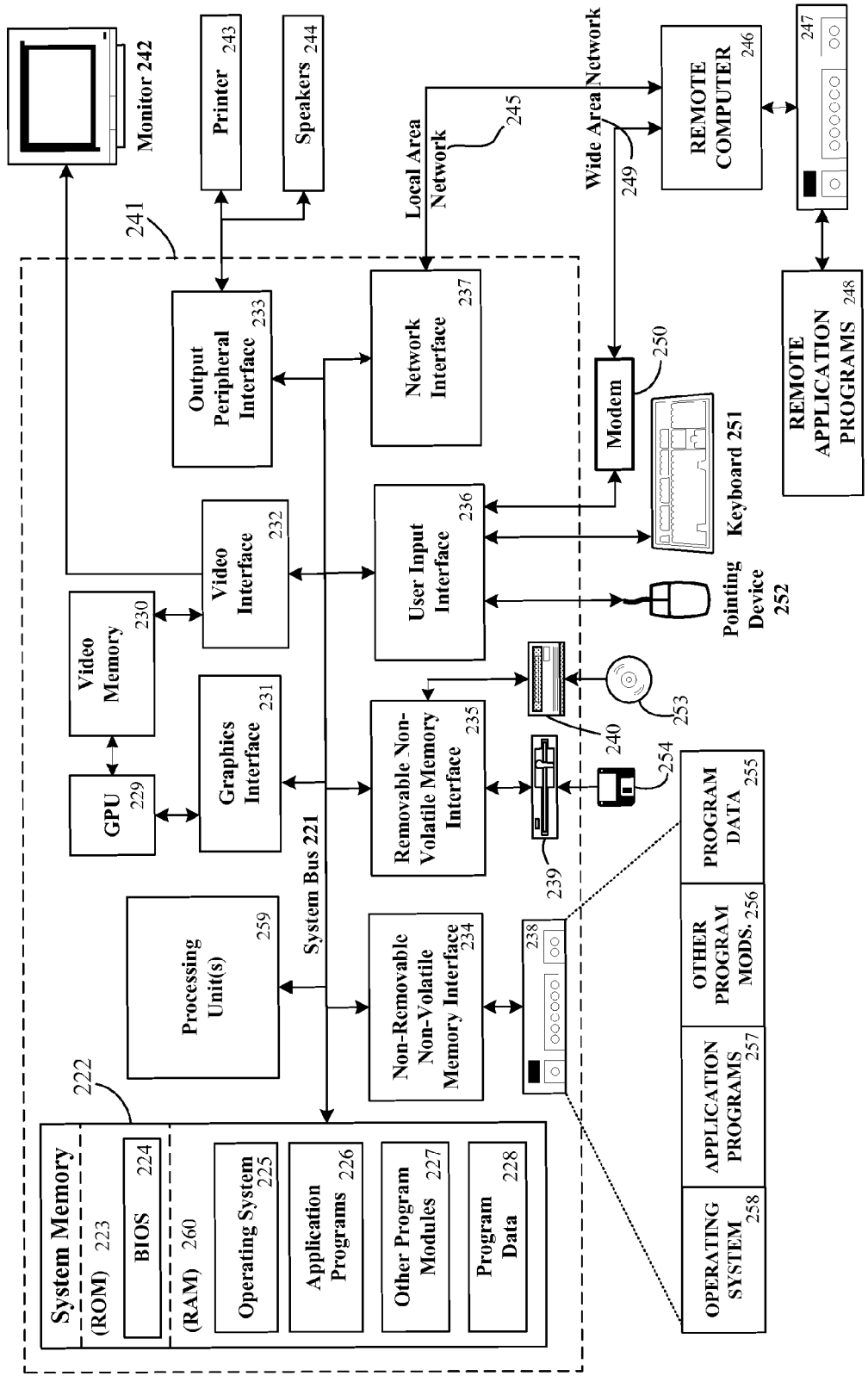
FIG. 9 depicts another example block diagram of a computing environment that may be used in the motion capture system of FIG. 5.

FIG. 9 depicts another example block diagram of a computing environment that may be used in the motion capture system of FIG. 5. In a motion capture system, the computing environment can be used to determine depth images, as well as to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 9, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 6, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 9 depicts remote application programs 248 as residing on memory device 247. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An illumination system, comprising:
   an image sensor having a photosensor configured to capture images of objects in a field of view external to the illumination system, the image sensor having an optical axis;
   a light source;
   a refractive diffuser configured to receive light from the light source, the refractive diffuser having a first array of convex lenses having convex surfaces facing the light source and a second array of convex lenses having convex surfaces facing away from the light source, wherein the refractive diffuser is configured to refract the light from the light source to structure the light to have gradually increasing intensity with increasing angular displacement from the optical axis; and
   logic that is configured to generate a depth image having depth values to the objects based on light received by the photosensor when the light from the light source is being refractive into the field of view.

2. The illumination system of claim 1, further comprising a collimator that receives the light from the light source, wherein the refractive diffuser is configured to receive collimated light and structure the collimated light to illuminate the field of view to compensate irradiance of images of objects in the field of view captured by the photosensor for dependence on angular displacement from the optical axis.

3. The illumination system of claim 1, wherein the refractive diffuser is configured to diffuse the light to illuminate objects in the field of view in accordance with $1/\cos^4 \theta$, where $\theta$ is the angular displacement from the optical axis.

4. A depth camera system comprising:
   an image sensor having a photosensor that is configured to capture images of objects in a field of view, the image sensor having an optical axis;
   an illuminator that comprises a light source, a collimator, and a refractive diffuser that comprises a first array of convex lenses having convex surfaces that face towards the light source and a second array of convex lenses having convex surfaces that face away from the light source;
   wherein the collimator is configured to collimate light from the light source; and
   wherein the refractive diffuser is configured to receive light from the light source, the first and second arrays of convex lenses being configured to refract the light from the light source to structure the light within the field of view in accordance with $1/\cos^4 \theta$, where $\theta$ is the angular displacement from the optical axis; and
   logic that is configured to generate a depth image based on the light received by the photosensor when the light is being structured within the field of view in accordance with $1/\cos^4 \theta$.

5. The depth camera system of claim 4, wherein the refractive diffuser is configured to structure the light such that similar objects in the same spherical surface in the field of view, but at different angular displacements from the optical axis, have substantially the same irradiance on the photosensor.

6. The depth camera system of claim 4, wherein the refractive diffuser is configured to structure the light to compensate for dependence of irradiance of images of objects having a given exitance that are captured by the photosensor on angular displacement from the optical axis.

7. The depth camera system of claim 6, wherein the refractive diffuser is configured to structure the light to drop off in intensity outside of the field of view.

8. A method of generating a depth image, comprising:
   refracting light from a light source onto objects in a field of view (FOV) of a depth camera using a refractive diffuser having a surface that refracts the light, wherein the refractive diffuser includes a first array of convex lenses having convex surfaces that face towards the light source and a second array of convex lenses having convex surfaces that face away from the light source, including projecting the light from the light source through the first array of convex lenses and through the second array of convex lenses;
   capturing portions of the refracted light that returns from objects in the field of view at a photosensor of the depth camera having an optical axis, wherein refracting the light includes refracting the light with the first and second arrays of lenses to gradually increase light intensity with increasing angular displacement from the optical axis; and
   generating a depth image that includes depth values to the objects based on the captured light.

9. The method of claim 8, wherein refracting the light includes diffusing the light in accordance with the formula $1/\cos^4 \theta$, wherein $\theta$ is the angular displacement from the optical axis.

10. The method of claim 8, wherein the refracting light onto objects in a field of view using a refractive diffuser includes structuring the light to falloff in intensity outside of the field of view.

11. The method of claim 8, further comprising:
generating a light beam;
collimating the light beam, wherein refracting the light includes refracting the collimated light beam.

12. The illumination system of claim 1, wherein the logic that is configured to generate a depth image having depth values to the objects based on light received by the photosensor includes:
logic configured to determine depth values based on time of flight, wherein the depth values are based on light intensity received at the photosensor.

13. The illumination system of claim 1, wherein the convex surfaces of the first array of convex lenses and the convex surfaces of the second array of convex lenses face each other.

14. The illumination system of claim 13, wherein there is an air gap between the convex surfaces of the first array of convex lenses and the convex surfaces of the second array of convex lenses.

15. The illumination system of claim 1, wherein the convex surfaces of the first array of convex lenses and the convex surfaces of the second array of convex lenses face away from each other.

16. The illumination system of claim 15, wherein there is an air gap between the first array of convex lenses and the second array of convex lenses.

17. The depth camera system of claim 4, wherein the convex surfaces of the first array of convex lenses and the convex surfaces of the second array of convex lenses face each other.

18. The depth camera system of claim 4, wherein the convex surfaces of the first array of convex lenses and the convex surfaces of the second array of convex lenses face away from each other.

19. The method of claim 9, wherein the convex surfaces of the first array of convex lenses and the convex surfaces of the second array of convex lenses face each other, wherein the method further comprises:
projecting light from the light source into the second array of convex lenses, then out of the convex surfaces of the second array of convex lenses, then into the convex surfaces of the first array of convex lenses, and then out of the first array of convex lenses.

20. The method of claim 9, wherein the first array of convex lenses and the second array of convex lenses face away from each other, wherein the method further comprises:
projecting light from the light source into the convex surfaces of the first array of convex lenses, then out of the first array of convex lenses, then into the second array of convex lenses, and then out of the convex surfaces of the second array of convex lenses.

* * * * *